(12) United States Patent
Ben David et al.

(10) Patent No.: US 10,462,180 B1
(45) Date of Patent: Oct. 29, 2019

(54) SYSTEM AND METHOD FOR MITIGATING PHISHING ATTACKS AGAINST A SECURED COMPUTING DEVICE

(71) Applicant: IntSights Cyber Intelligence Ltd., Herzliya (IL)

(72) Inventors: Gal Ben David, Petah Tikva (IL); Amir Hozez, Ganei Tiqwa (IL); Alon Arvatz, Raanana (IL); Guy Nizan, New York, NY (US)

(73) Assignee: IntSights Cyber Intelligence Ltd., Tel Aviv (IL)

( * ) Notice: Subject to any disclaimer, the term of this patent is extended or adjusted under 35 U.S.C. 154(b) by 0 days.

(21) Appl. No.: 16/243,104

(22) Filed: Jan. 9, 2019

(51) Int. Cl.
*H04L 29/06* (2006.01)

(52) U.S. Cl.
CPC ...... *H04L 63/1483* (2013.01); *H04L 63/1416* (2013.01)

(58) Field of Classification Search
CPC .. H04L 63/14; H04L 63/1418; H04L 63/1416
See application file for complete search history.

(56) References Cited

U.S. PATENT DOCUMENTS

| | | | |
|---|---|---|---|
| 2013/0191915 A1* | 7/2013 | Antonakakis | H04L 63/14 726/23 |
| 2013/0318353 A1* | 11/2013 | Skarda | H04L 9/3263 713/175 |
| 2017/0180312 A1* | 6/2017 | Sullivan | H04L 61/3025 |
| 2018/0077120 A1* | 3/2018 | Baughman | H04L 63/0281 |

OTHER PUBLICATIONS

Trendmicro, obtained on Mar. 10, 2019 from https://blog.trendmicro.com/domain-generating-algorithms-dgas/ (Year: 2016).*
Akamia Research, obtianed on Mar. 10, 2019 from https://blogs.akamai.com/2018/01/a-death-match-of-domain-generation-algorithms.html (Year: 2017).*

* cited by examiner

*Primary Examiner* — Tri M Tran
(74) *Attorney, Agent, or Firm* — Pearl Cohen Zedek Latzer Baratz LLP

(57) ABSTRACT

A system and a method for mitigating phishing attacks against a secured computing device. The method may include: obtaining at least one first domain name; attributing a registration time stamp (RTS) associated with timing of a registration of the at least one domain name at a domain registrar; and configuring at least one perimeter module to restrict at least one data transmission between the secured computing device and a computing device that is associated with the first domain name, based on the RTS.

16 Claims, 5 Drawing Sheets

SYSTEM AND METHOD FOR MITIGATING PHISHING ATTACKS AGAINST A SECURED COMPUTING DEVICE

FIELD OF THE INVENTION

The present invention relates generally to internet security. More specifically, the present invention relates to mitigating phishing attacks against a secured computing device.

BACKGROUND OF THE INVENTION

The protection of private and organizational information and computational assets is a well-established need. Hacking and phishing attempts against computational systems are ubiquitous, and the perseverance of perpetrators seems limitless.

Common phishing attempts are frequently performed by perpetrators who may register a new internet domain, having a new domain name at a domain registrar. The new domain name (e.g., google.com, with three 'o's) may resemble that of a known and trusted domain name (e.g., google.com, with two 'o's), to fool a target user into thinking they are browsing a trusted web page and thus unsuspectingly disclose data to the perpetrator. Such domains can be referred to as phishing domains.

Perpetrators may also produce a certificate for their newly registered phishing domain, to, for example, bypass security measures that are commonly taken by commercially available web browsers.

State of the art solutions for such attacks are commonly centered on computational entities between the target user and their respective email server or network gateway. For example, a commercially available solution may include a mail gateway or proxy server, that may filter email messages according to their content. This may include, for example, quarantining of emails that are directed to lure people into clicking dubious links, transfer money, upload or download files, etc.

Additional commercially available solutions repelling attacks via phishing domains may include mail servers that are configured to detect suspicious messages according to, for example: $3^{rd}$ party reports of suspicious domains, dubious links within an email, and various rule-based algorithms and machine-learning (ML) based techniques such as Natural Language Processing (NLP).

State of the art solutions can depend on successful analysis of content of a received message to determine whether it may be suspicious or whether it may be propagated to the targeted user.

SUMMARY OF THE INVENTION

State of the art systems and methods for prevention and/or repelling of phishing attempts typically disregard the fact that an overwhelmingly high percentage of phishing attacks via registered phishing web domains typically occur within a very short time from the domains registration by the perpetrator. Phishing domains are typically detected and/or reported upon within several days, and are then usually abandoned by the perpetrator, who may resume their deeds elsewhere, via a new registered domain.

Moreover, state of the art methods and systems can disregard the fact that the relevance, significance and/or importance of a message that may originate from a newly registered domain may be negligible. For example, a first organization may be steadily (e.g., over a long period of time, such as months and years) commercially associated with one or more second organizations via the second organization(s) web-site and respective domain In this example, the probability that a message arriving from a third-party's domain may be commercially critical may normally not be high, and hence that message may be safely quarantined, until a predefined quarantine period will elapse.

A method and a system for restricting access of a protected computing system to newly registered domains can be desired.

A domain (e.g., a group of internet addresses that may be associated with and/or granted to an individual or an organization) may be attributed a domain name that may be associated with a respective internet protocol (IP) address. A domain may have a hierarchical architecture and may include one or more domain names according to this hierarchy.

The term 'secured' may be used herein, in relation to a registered domain or a computing device to refer to a condition in which a user may not be fooled by a perpetrator to inadvertently perform actions (e.g., download data or provide information) via a phishing domain.

Embodiments of the present invention may include a method for mitigating phishing attacks against a secured computing device. The method may include:
  obtaining, by one or more processors, at least one first domain name;
  attributing by the one or more processors, a registration time stamp (RTS) associated with timing of a registration of the at least one domain name at a domain registrar; and
  configuring, by the one or more processors, at least one perimeter module to restrict at least one data transmission between the secured computing device and a computing device that may be associated with the first domain name, based on the RTS.

According to some embodiments of the invention, attributing the RTS may include:
  receiving, by the one or more processors, from one or more domain registrars, at least one first zone file at a first timing and at least one second zone file at a second timing;
  analyzing, by the one or more processors, the first zone file and second zone file to detect at least one newly registered domain name; and
  attributing, by the one or more processors, an RTS to the at least one newly registered domain name according to at least one of the first timing and the second timing.

According to some embodiments of the invention, analyzing the zone files may include:
  parsing, by the one or more processors, the first zone file, to produce a first list may include one or more domain names;
  parsing, by the one or more processors, the second zone file, to produce a second list including one or more domain names; and
  comparing, by the one or more processors, the first list and second list to detect at least one domain name that may be present only in one of the first zone file and second zone file.

Embodiments of the method may include:
  receiving, by the one or more processors, a list that includes at least one permutation setting;
  producing, by the one or more processors, a plurality of domain name permutations (DNPs), based on the list of permutation settings, on at least one domain name; and querying, by the one or more processors, at least one external online resource, per at least one produced DNP, whether the DNP may be registered at a domain registrar.

At least one online external data source may be selected from a list that may include: a domain registrar server, a certification authority (CA) server.

Domain name permutations may be produced from at least one of: the first obtained domain name and a domain name that may be associated with the secured computing device.

At least one permutation setting may be selected from a list that may include at least one of: duplicating at least one letter of a domain name; and replacing a Top-Level Domain (TLD) suffix of the domain name with another TLD.

According to some embodiments of the method, querying may be performed at least at a first timing and at a second, later timing, to determine at least one newly registered DNP, and the method may further include attributing an RTS to the at least one newly registered DNP according to at least one of the first and second timings.

According to some embodiments of the invention, querying whether the domain name may be registered at a domain registrar may include:
extracting a TLD suffix of the domain name;
querying at least one global root Domain Name Server (DNS) for an identification of a first Authoritative Name Server (ANS) associated with the extracted TLD; and
querying the first ANS for an identification of a second ANS associated with the domain name.

If the first ANS responds with the identification of the second ANS then embodiments of the method may include determining that the domain name may be registered at a domain registrar. If the first ANS does not respond with the identification of the second ANS then embodiments of the method may include determining that the domain name may be not registered at a domain registrar.

Embodiments of the method may include:
querying, by the at least one processor, at least one CA to obtain at least one first certificate transparency log at a first timing and at least one second certificate transparency log at a second timing;
analyzing the at least one first certificate transparency log and at least one second certificate transparency log to detect at least one newly signed certificate;
parsing, by the at least one processor, the newly signed certificate to obtain at least one domain name associated with the newly signed certificate; and
attributing an RTS to the at least one obtained domain name according to at least one of the first and second timings.

According to some embodiments of the method, obtaining at least one first domain name may include:
a. producing at least one subset of all possible 2^32 Internet Protocol (IP) addresses;
b. utilizing a web browser to browse the internet using the at least one produced subset of IP addresses at a first timing; and
c. if the web browser is directed to an internet web page, then embodiments of the method may include extracting at least one domain name from the directed web page, and storing the extracted domain name in a first list of domain names.

Embodiments of the method may include repeating steps b and c at a second timing, to produce a second list of domain names and analyzing the lists of domain names to obtain at least one new domain, that may be associated with a newly registered domain name.

According to some embodiments, the method may include:
a. utilizing, by the at least one processor a web browser to browse the internet using the at least one first domain name;
b. if the web browser is directed to an internet web page, then embodiments of the method may include extracting, by the at least one processor, at least one second domain name from the directed web page; and
c. storing the extracted domain name in a first list of domain names.

Embodiments of the method may include repeating the steps b and c at a second timing, to produce a second list of domain names and analyzing, by the at least one processor, the lists of domain names to obtain at least one new domain, associated with a newly registered domain name.

According to some embodiments of the method, restriction of data transmission may include at least one of:
blocking at least one message from the second computing device;
applying a quarantine on at least one message from the second computing device;
blocking at least one message from the secured computing device;
applying a quarantine on at least one message from the secured computing device; and
blocking browsing of the secured computing device in the registered domain.

The at least one perimeter module may be selected from a list that may include at least one of:
a mail gateway;
a web proxy server;
a firewall server;
a Domain Name Server (DNS);
a Virtual Private Network (VPN) server;
a Security Information and Event Management (SIEM) software; and
an Endpoint Protection Solution (EPS).

According to some embodiments of the method:
if a difference between an obtained RTS pertaining to a registered domain name and the current time does not exceed a predefined threshold, then adding an entry in a restriction list, that may associate the registered domain name with the respective RTS; and
if a difference between an RTS in the restriction list and the current time exceeds the predefined threshold, then omitting the entry that may associate the registered domain name with the respective RTS from the restriction list.

Embodiments of the method may include configuring the at least one perimeter module to restrict at least one data transmission between the secured computing device and a second computing device according to the restriction list.

Embodiments of the present invention may include a system for mitigating phishing attacks against a secured computing device. The system may include: a non-transitory memory device, wherein modules of instruction code are stored, and at least one processor associated with the memory device, and configured to execute the modules of instruction code.

Upon execution of the modules of instruction code, the at least one processor may be further configured to perform at least one of:
obtain at least one first domain name;

attribute a registration time stamp (RTS) associated with timing of a registration of the at least one domain name at a domain registrar; and configure at least one perimeter module to restrict at least one data transmission between the secured computing device and a computing device that may be associated with the first domain name, based on the RTS.

Embodiments of the present invention may include a method for restricting transfer of data between a first computing device and a second computing device. The method may include:

querying at least one online external resource at a first timing and at a second timing, to obtain at least one data element including at least one domain name;

comparing the data element of the first timing and the data element of the second timing to identify at least one difference therebetween;

producing a list of suspected domain names according to the differentiation; and configuring at least one perimeter module to restrict at least one data transmission between the first computing device and a second computing device, based on the current time and at least one of the first timing and second timing.

BRIEF DESCRIPTION OF THE DRAWINGS

The subject matter regarded as the invention may be particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
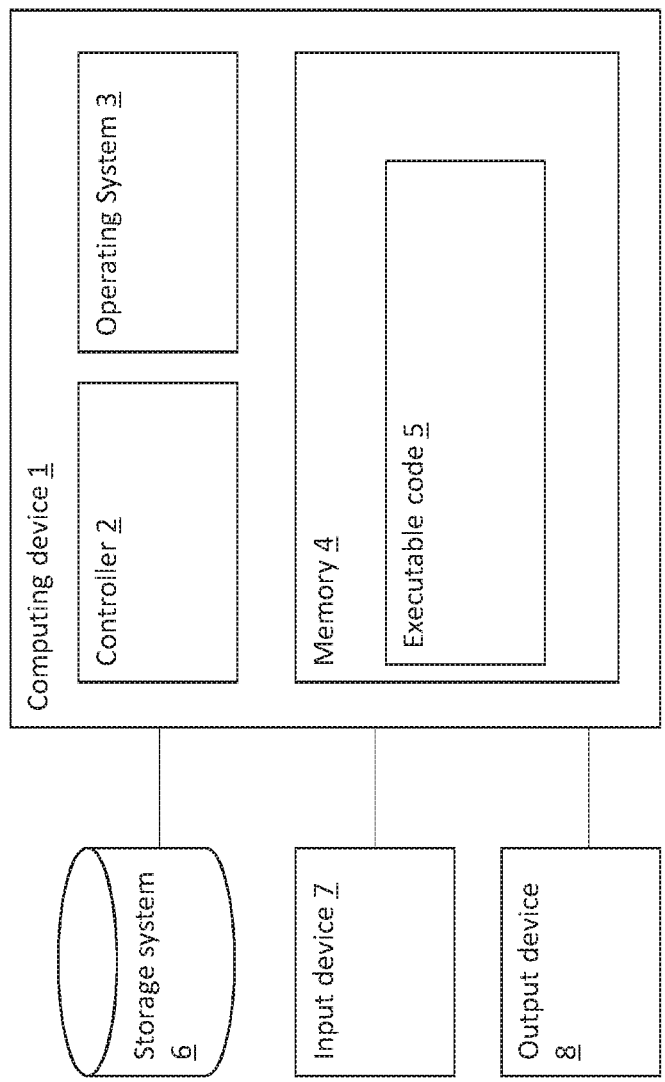
FIG. 1 is a block diagram, depicting a computing device that may be included in a system for mitigating phishing attacks against a secured computing device according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment of the invention may be combined with features or elements described with respect to other embodiments of the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention can include a method and a system for mitigating phishing attacks against a secured computing device. Some embodiments of the invention may obtain at least one domain name that may be relevant to the secured computing device, ascertain whether there is a domain registered at a domain registrar under the obtained domain name, ascertain whether the domain has been lately registered (e.g., within a predefined period of time), and/or if so—restrict data transactions between the secured computing device (e.g., a first computer) and another computing device (e.g., a second computer) included in or associated with or included in the newly-registered domain (e.g., a computer that may be identified over the internet by an internet protocol (IP) address that may be associated via a domain name server with the newly registered domain, as known in the art).

Reference is now made to FIG. 1, which is a block diagram depicting a computing device, which may be included within an embodiment of a system for mitigating phishing attacks against a secured computing device, according to some embodiments of the invention.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments of the invention, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may mitigate phishing attacks against a secured computing device as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that may be internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments of the invention, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
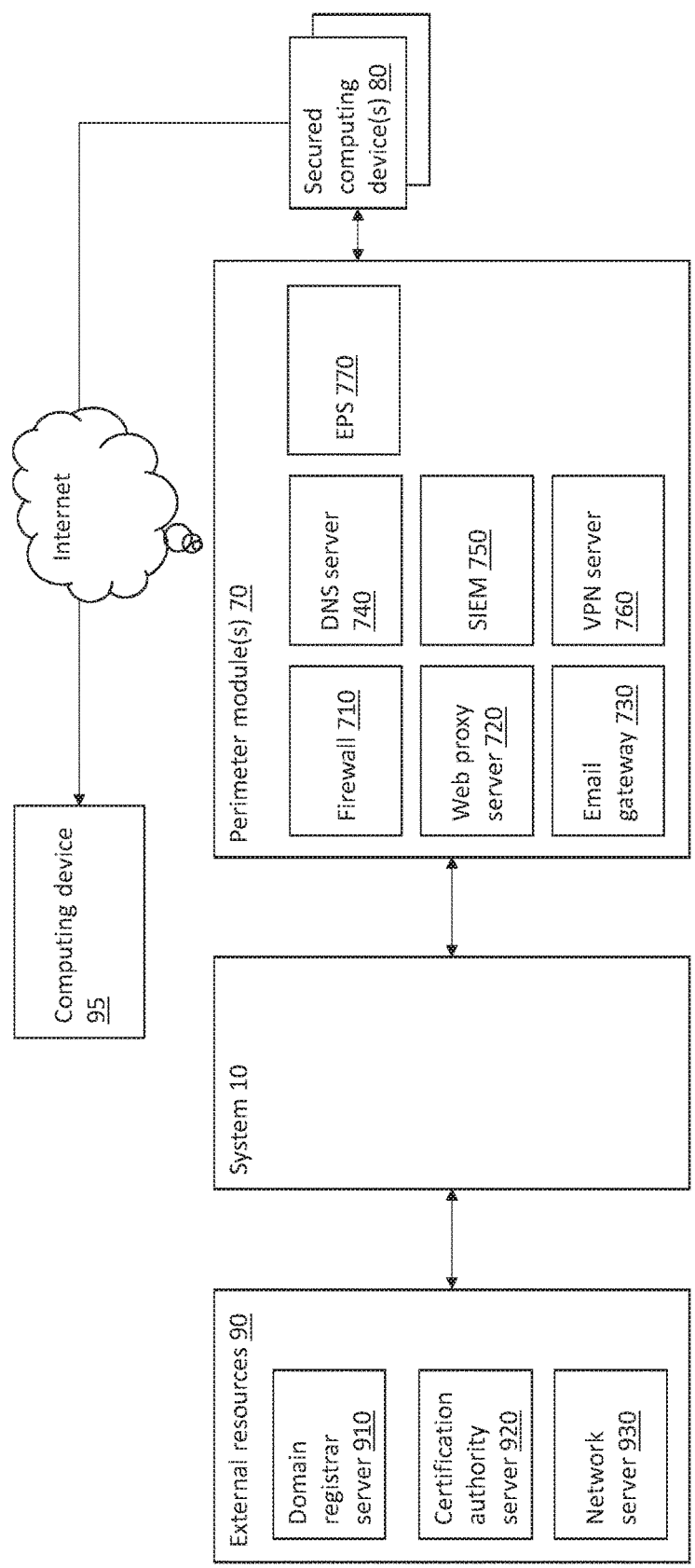
FIG. 2 is a block diagram, depicting a system for mitigating phishing attacks against a secured computing device according to some embodiments of the invention.

Reference is now made to FIG. 2, which is a block diagram depicting a system 10 for mitigating phishing attacks against a secured computing device according to some embodiments of the invention. System 10 may be or may include at least one computing device (e.g., element 1 of FIG. 1), including at least one processor (e.g., element 1 of FIG. 2), adapted to perform at least one method of mitigating phishing attacks against a secured computing device according to some embodiments of the invention.

As shown in FIG. 2, system 10 may be communicatively connected to one or more secured computing devices 80 via one or more perimeter modules 70. For example, the one or more secured computing devices 80 may be associated with an organization or a company (e.g., company-name), having a registered internet domain and a respective domain name (e.g., company-name.com). The one or more secured computing devices 80 may include an organizational network infrastructure such as a Local Area Network (LAN) and may be connected to the internet via at least one perimeter module 70, such as a web proxy server and an email gateway.

In some embodiments of the invention, system 10 may be remotely connected to the at least one perimeter module 70. For example, system 10 may be implemented as a service on a cloud server and may be connected to the at least one perimeter module 70 via the internet. Alternately or additionally, system 10 may be locally connected to the at least one perimeter module 70. Pertaining to the example above, system 10 may reside within the domain of company-name and may connect to the at least one perimeter module 70 via an organizational LAN.

System 10 may be communicatively connected (e.g., via the internet) to one or more online external resources 90, including for example a domain registrar server 910, a certification authority server 920, a network server 930, and the like. System 10 may obtain from the one or more external resources 90 information pertaining to at least one domain name and analyze the obtained information, to determine whether a domain associated with the at least one domain name may be suspicious (e.g., used for phishing purposes), as elaborated herein.

System 10 may be configured to access the at least one perimeter module 70 (e.g., an email gateway) to apply settings or configurations thereupon, to restrict the transfer of data between the one or more secured computing device 80 and a second computing device 95 (e.g., a computing device associated with a phishing domain), based on the analysis of the domain name. For example, system 10 may restrict access of secured computing device 80 to a suspicious internet domain, as explained herein.

Figure 3:
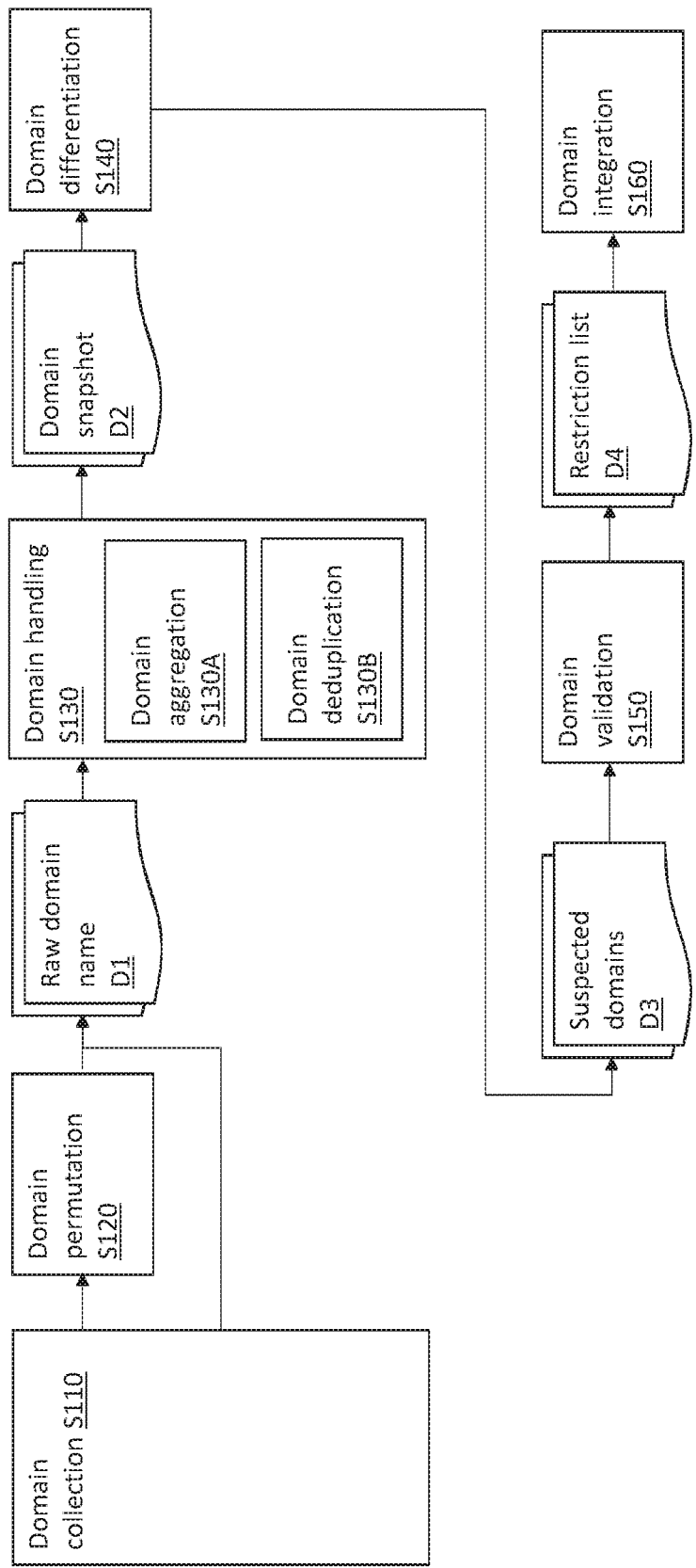
FIG. 3 is a flow diagram depicting a method for mitigating phishing attacks against a secured computing device according to some embodiments of the invention.

Reference is now made to FIG. 3, which is a flow diagram depicting a method for mitigating phishing attacks against a secured computing device according to some embodiments of the invention.

Embodiments of the method may include a domain collection step S110, in which one or more domain names that are yet to be analyzed by system 10 (e.g., one or more raw domain names D1) may be obtained.

Domain collection step S110 may include obtaining of one or more raw domain names D1 from at least one external resource, such as a domain registrar server (e.g., element 910 of FIG. 2). Additionally, or alternatively, domain collection step S110 may include obtaining one or more raw domain names D1 from at least one perimeter module, such as a web proxy server (e.g., element 720 of FIG. 2), and verifying the registration of the obtained one or more raw domain names D1 using at least one external resource. The process of obtaining the one or more raw domain names D1 may be elaborated in more detail in relation to FIG. 4.

Embodiments of the method may include a domain permutation step 120, adapted to produce a plurality of raw domain names D1 based on permutation of the one or more obtained raw domain names D1, as elaborated below, in relation to FIG. 4.

Figure 4:
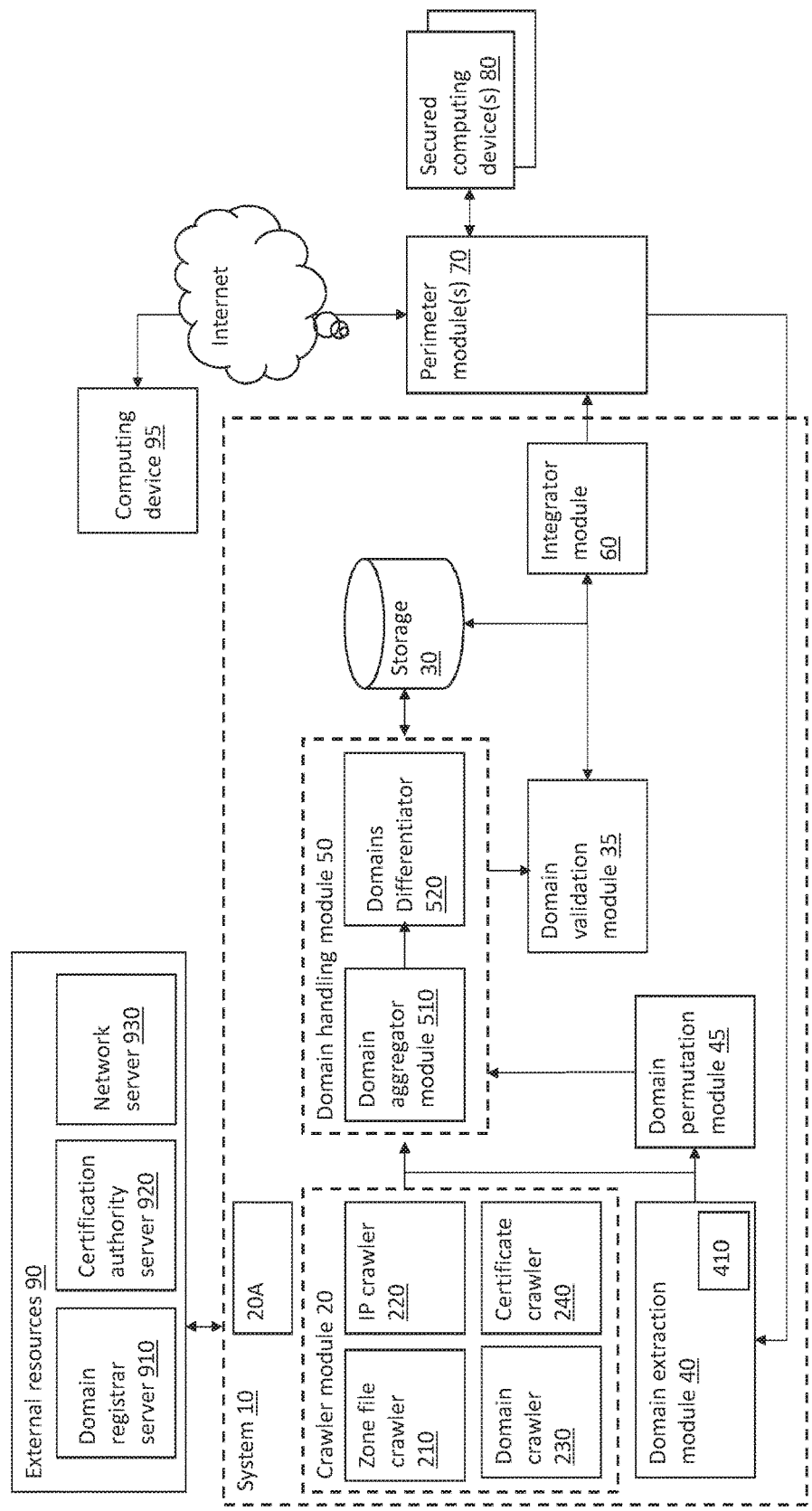
FIG. 4 is a block diagram depicting a system for mitigating phishing attacks against a secured computing device according to some embodiments of the invention.

Embodiments of the method may include a domain handling step S130, adapted to produce a domain snapshot list D2, including one or more entries of raw domain names D1, at a specific timing, as elaborated herein in relation to FIG. 4.

Domain handling step S130 may include a domain aggregation step 130A, adapted to aggregate or merge the raw domain names D1 originating from the one or more external resources 90 and/or the one or more perimeter modules 70, into domain snapshot list D2 as elaborated herein in relation to FIG. 4.

In some embodiments of the invention, domain handling step S130 may include a domain deduplication step S130B, adapted to deduplicate or uniquify the plurality of obtained raw domain names D1, to obtain a domain snapshot list D2 that may include one or more entries of raw domain names D1, where each domain name appears exactly in one entry, as elaborated herein in relation to FIG. 4.

Embodiments of the method may include a domain differentiation step S140, adapted to differentiate between two or more domain snapshot lists D2 to identify at least one difference therebetween, and produce a list of suspected domains D3 according to the differentiation, as elaborated herein in relation to FIG. 4.

For example, domain differentiation step S140 may be adapted to identify at least one domain name that may not appear in a first domain snapshot list D2 of a first timing and appear in a second domain snapshot list D2 of a later, second timing. The identified at least one domain name may be included as an entry in a list of suspected domain names D3.

Embodiments of the method may include a domain validation step S150, adapted to analyze at least one suspected domain name D3, to produce a restriction list D4, including one or more domain names for which data transfer needs to be restricted, as elaborated herein in relation to FIG. 4.

Embodiments of the method may further include configuring at least one perimeter module (e.g., element 70 of FIG. 2) to restrict transfer of data between at least one secured computing device (e.g., element 80 of FIG. 2) and a second computing device (e.g., element 95 of FIG. 2) that may be associated with or included in a domain corresponding with restricted domain name D4 (e.g., a computer that may use an identifying IP address that may be associated with restricted domain name D4, as known in the art). Restriction of data transfer between secured computing device 80 and the second computing device 95 may be elaborated in more detail in relation to FIG. 4.

Reference is now made to FIG. 4, which is a block diagram depicting a system 10 for mitigating phishing attacks against a secured computing device according to some embodiments of the invention.

System 10 may obtain at least one first domain name, as elaborated herein and determine whether the domain name represents a suspicious domain. For example, system 10 may obtain from an organizational perimeter module 70 that may be an organizational email gateway, at least one domain name that may be included in an email correspondence between a first user of secured computing device 80 that may be included within the organizations local network and a second user. In a second example, system 10 may obtain at least one domain name directly from a user (e.g., via input element 7 of FIG. 1).

System 10 may be configured to determine whether the domain name may be associated with a registered domain, and obtain, as elaborated herein, a registration time stamp (RTS) associated with timing of a registration of the at least one obtained domain name at a domain registrar.

System 10 may then configure at least one perimeter module 70 to restrict at least one data transmission between secured computing device 80 and a computing device that may be associated with, or included in the obtained domain name, based on or according to the RTS. For example, if the RTS presents a first timing, and the difference between the current time and the first timing does not exceed a predefined threshold (e.g., when the domain may be newly-registered), then system 10 may configure at least one perimeter module 70 (e.g., a web proxy server) to disallow communication between secured computing device 80 and another device associated with or included in the newly-registered domain.

As elaborated herein, system 10 may be configured to implement one or more methods for obtaining domain names, one or more methods for determining whether the obtained names are registered and one or more methods for determining whether a registered domain name has been registered lately.

According to some embodiments of the invention, system 10 may include a domain extraction module 40, configured to extract or obtain a raw domain name (e.g., element D1 of FIG. 3) from at least one perimeter module 70 and/or secured computing device 80.

Domain extraction module 40 may obtain at least one data element (e.g., an email message) from at least one perimeter module 70 (e.g., an email server), and analyze the at least one data element to extract one or more raw domain names D1 therefrom. Additionally, or alternately, domain extraction module 40 may receive at least one raw domain name D1 (e.g., via input element 7 of FIG. 1) from a user of at least one secured computing device 80.

Domain extraction module 40 may attribute a timestamp to the at least one raw domain name D1, marking the timing at which the raw domain name D1 was obtained.

For example, secured computing device 80 may be included within an infrastructure (e.g., within a domain, as known in the art) of an organization or a company (e.g., "company-name"). Domain extraction module 40 may extract one or more raw domain names D1 associated with secured computing device 80, such as a domain name (e.g., "company-name com") and/or sub-domain name(s) associated with the organization or company (e.g. "www.company-name-com").

In some embodiments of the invention, domain extraction module 40 may extract at least one raw domain name in real-time or in near real-time, following an event on at least one secured computing device 80 and/or perimeter module 70.

For example, a user may browse a web page on a secured computing device 80. A perimeter device 70 such as a web proxy server may propagate data including a Uniform Resource Locator (URL) line associated with the browsing and/or a link that may appear on the web page to domain extraction module 40. Domain extraction module 40 may in turn extract the respective domain name and/or sub-domain names as raw domain names D1. Domain extraction module

40 may attribute a timestamp to the at least one raw domain name D1, marking the time at which the user has browsed the web page.

In yet another example, a user of a secured computing device 80 may send and/or receive an email from a computing device 95, that may be associated with or included in a remote domain name A perimeter device 70 such as an email gateway 730 may propagate data including the domain associated with computing device 95 to domain extraction module 40. Domain extraction module 40 may in turn extract the respective domain name as a raw domain name D1, and may attribute a timestamp to the at least one raw domain name D1, marking the time at which the email was sent and/or received.

In some embodiments of the invention, domain extraction module 40 may maintain a "white list" 410, that may include one or more trusted domain names, and only produce as output raw domain names D1 that do not appear in white list 410. Pertaining to the example of the email above, domain extraction module 40 may emit the domain name associated with the email as a raw domain name D1, on condition that the domain name may not be present on white list 410 of trusted domain names.

In some embodiments of the invention, domain extraction module 40 may include at least one raw domain name D1 as an entry in white list 410, according to the respective timestamp. Pertaining to the same example of the raw domain name D1 associated with an email, if the current time has surpassed the timestamp attributed to the raw domain name D1 by a predefined threshold, then domain extraction module 40 may add the domain name as an entry in white list 410, and thus avoid emitting the same domain name as a raw domain name D1 following a future event (e.g., another received email, that may include the same domain name).

According to some embodiments of the invention, system 10 may include a crawler module 20, configured to access at least one external resource 90, and obtain at least one raw domain name D1 therefrom.

Crawler module 20 may access at least one external resource 90, and query it for at least one data element including at least one domain name. As shown in the example depicted in FIG. 4, crawler module 20 may include one or more sub-modules, configured to extract at least one raw domain names D1. The one or more sub-modules may include, for example: a zone-file crawler 210, an IP crawler 220, a domain crawler 230 and a certificate crawler 240.

As known in the art, A Top-Level Domain (TLD) represents the highest hierarchy in a structure of a domain name and may be normally manifested as the last segment of the domain name (e.g., the letters immediately following the final dot in an Internet address, such as the 'com' in section in the www.company-name-com domain name). A subset of TLDs may be referred to as Generic TLDs (GTLDs), which include .com, .org, .info and .net TLDs. Registrars of GTLDs are required by contract to maintain at least one data structure (e.g., a text file) that contains mappings between domain names and respective name servers (e.g., entities that may accommodate a response to a service protocol request directed at a specific domain name, as known in the art), and make the data structure available for public query. This data structure may be referred to in the industry as a zone file.

Zone-file crawler 210 may be configured to connect to at least one domain registrar and query the domain registrar to receive a content of at least one first zone file at a first timing. Zone-file crawler 210 may parse the received first zone file to extract a first list including at least one raw domain name D1 therefrom and attribute a timestamp of the first timing (e.g., the time at which the query was responded) to the at least one extracted raw domain name D1 of the first list.

Zone-file crawler 210 may store (e.g., in storage module 30) the at least one raw domain name D1 and the respective at least one attributed timestamp as any type of appropriate data structure. For example, zone-file crawler 210 may store the data in a table, associating at least one extracted domain name with a Coordinated Universal Time (UTC) timestamp of the time at which the domain name was extracted.

System 10 may include a domain handling module 50, configured to receive a list including at least one raw domain name D1, and produce a list of suspected domains therefrom (e.g., element D3 of FIG. 3).

As shown in FIG. 4, domain handling module 50 may include a domain aggregator module 510, configured to aggregate or merge one or more raw domain names D1 (e.g., step S130A of FIG. 3), extracted by one or more modules (e.g., crawler module 20 and domain extraction module 40), to create a list of domain names at a specific timing. This list may herein be referred to as a "domain snapshot" (e.g., element D2 in FIG. 3).

In some embodiments of the invention, domain aggregator module 510 may further perform deduplication (e.g., step S130B in FIG. 3) of the aggregated raw domain names D1, to uniquify the list of raw domain names D1. Domain aggregator module 510 may thus produce a list of domain names at a specific timing (e.g., a domain snapshot) D2 as a list in which every raw domain name D1 is represented by exactly one entry, associated by a respective timestamp.

For example, domain extraction module 40 may produce a first group of raw domain names D1, and zone file crawler 210 may produce a second group of raw domain names D1, at a first timing. Domain handling module 50 may aggregate the raw domain names D1 of domain extraction module 40 and file crawler 210 to a first list of unique raw domain names at a first timing.

In some embodiments of the invention, at least one crawler module (e.g., zone-file crawler 210) may repeat the query at a later, second timing to receive a second list of raw domain names D1. For example, zone-file crawler 210 may query a domain registrar server 910 at the second timing to receive a second zone file and parse the second zone file, to produce or extract a second list including one or more second raw domain names D1. Domain aggregator module 510 may subsequently produce a second list of domain names at a specific timing (e.g., a domain snapshot) D2, including a second unique list of raw domain names D1 at the second timing.

System 10 may include a domain differentiator module 520 configured to analyze one or more lists of domain names at a specific timing (e.g., one or more domain snapshots) D2 to detect at least one newly registered domain name.

For example, domain differentiator 510 may compare or differentiate between a first domain snapshot D2 including raw domain names D1 originating from a first zone file obtained at a first timing and second domain snapshot D2 originating from a second zone file obtained at a second timing, to detect domain names that are present only in one of the first and second zone files (e.g., domain names that may have been added between the first timing and the second timing). These domain names may herein be referred to as "suspected" domain names (e.g., element D3 in FIG. 3).

Domain differentiator 520 may attribute a Registration Time Stamp (RTS) to at least one domain name that may be present only in one of the first and second zone files (e.g., a suspected domain name) D3 according to at least one of the first and second timings. For example, domain differentiator 520 may attribute an RTS time stamp (e.g., a UTC timestamp) of the second timing, (e.g., the time at which the domain was first present as a registered domain on a zone file) as the closest known time of registration of the suspected, newly registered domain name D3.

Domain differentiator 520 may produce a list including one or more suspected domain names D3 and associate each suspected domain name D3 with a respective RTS. System 10 may then configure at least one perimeter module 70 to restrict data transfer between at least one protected computing device 80 and a different computing device (e.g., element 95) that may be associated with the suspected newly registered domain name D3 based on or according to the RTS, as elaborated herein.

As known in the art, a public key certificate, also known as a digital certificate or identity certificate, may be an electronic document used to prove the ownership of a public key. The certificate may include information about the key, information about the identity of the keys owner (e.g., a domain name for which the certificate has been issued) and a digital signature of an issuer that has verified the certificate's contents. If the signature is valid, and the software examining the certificate trusts the issuer, then the software may use that key to communicate securely with the certificate's subject.

Perpetrators that attempt to hack a victim's computing device via a phishing domain may commonly procure or issue a certificate for the phishing domain via a trusted certificate issuer, in order to bypass rudimentary security checks that may be conducted on the victim's side (e.g., by the victim's internet browser). Such a security check may include, for example, verification of existence of a certificate from a trusted issuer. Embodiments of the present invention may analyze the validity of new certificates to repel such phishing attacks as elaborated herein.

As known in the art, the certificate transparency standard may be an Internet security standard and open-source framework for monitoring and auditing digital certificates. As part of the certificate transparency standard, certificate issuer servers may be adapted to produce, upon request from a client computer, a certificate transparency log file, that may include a list of issued public key certificates and respective domain names.

System 10 may include a certificate crawler 240, configured to query at least one certificate authority (e.g., a certificate issuer) server 920 to obtain at least one first certificate transparency log, and extract at least one raw domain name D1 therefrom.

Certificate crawler 240 may analyze the log files to detect at least one signed or issued certificate. Certificate crawler 240 may query at least one certificate authority server 920 to receive data pertaining to the detected at least one signed or issued certificate. For example, Certificate crawler 240 may receive from certificate authority server 920 a copy of the public key certificate that may include the domain name associated with the newly signed or issued certificate. Certificate crawler 240 may parse the received data pertaining to the newly signed certificate to obtain at least one raw domain name D1.

In a similar manner to that described above in relation to raw domain names originating from zone files, domain aggregation module 510 may produce a lists of domain names at a specific timing (e.g., a domain snapshot) D2 including at least one unique entry of the raw domain name D1 obtained by certificate crawler 240.

Certificate crawler 240 may be configured to repeat the query so as to obtain at least one first certificate transparency log at a first timing and at least one second certificate transparency log at a second timing. Domain aggregation module 510 may subsequently produce a first domain snapshot D2 associated with the first timing and a second domain snapshot D2 associated with the second timing.

Domain differentiator module 520 may analyze the domain snapshots D2 to detect at least one raw domain name D1 that may be associated with a newly issued or signed certificate. For example, domain differentiator module 520 may perform a comparison between the first list of domain names at the first timing (e.g., the first domain snapshot) D2 and the second list of domain names at the second timing (e.g., the second domain snapshot) D2, to detected at least one raw domain name D1 that may be associated with a newly signed or issued certificate (e.g., a certificate that appeared on the second certificate log, but was not present on the first certificate log).

Domain differentiator 520 may attribute an RTS to the at least one obtained domain name according to at least one of the first and second timings. For example, Domain differentiator 520 may attribute an RTS time stamp (e.g., a UTC timestamp) of the second timing, (e.g., the time at which the newly signed or issued certificate was first present on a certificate transparency log) as the closest known time of certification of the respective domain name Domain differentiator 520 may include the raw domain name D1 associated with the newly signed or issued certificate in the list of suspected domain names D3.

System 10 may then configure at least one perimeter module 70 to restrict at least one data transmission between secured computing device 80 and a computing device that may be associated with the suspected, newly-certified domain name based on or according to the RTS, as elaborated herein.

In addition to the methods described above in relation to zone file parsing and certificate parsing, that may include the extraction of suspected, newly registered and/or certified domain names (e.g., as implemented via zone-file parsing and certification transparency log parsing respectively), embodiments of the present invention may include, as elaborated herein, one or more methods for:

proactively generating at least one domain name;
determining whether a domain associated with the generated domain name exists (e.g., whether such a domain name has been registered);
determining whether the domain has been registered recently; and
restricting at least one data transmission between secured computing device 80 and a second computing device that may be associated with the recently registered domain.

System 10 may include a domain permutations module 45, configured to receive (e.g., from at least one perimeter module 70, or from crawler module 20) at least one raw domain name D1 and proactively generate at least one other raw domain name D1 therefrom, by a process of domain name permutation enumeration, as explained herein.

For example, a perimeter module 70 (e.g., an internet proxy server) may be included in an Information Technology (IT) infrastructure of a company (e.g., "my-company"). The company may have a registered domain name (e.g., my-comany.com), and a plurality of secured computing devices

80 associated with that domain name Perimeter module 80 may forward data including the domain name to domain extraction module 40.

Domain extraction module 40 may extract the company's domain name as a first raw domain name D1, mark the company's raw domain name D1 as one that should be secured, and store it (e.g., in storage module 30).

Domain permutations module 45 may receive (e.g., from an administrator user, via input device 7 of FIG. 1) a list including at least one domain name permutation setting. The at least one domain name permutation setting may dictate the production or generation of a plurality of second raw domain names D1 from the first domain name. The plurality of second raw domain names D1 may herein be referred to as "domain name permutations" (DNPs).

For example, domain permutations module 45 may receive a permutation list that may include, for example, a first setting that may require letter duplication (e.g., duplicating at least one letter of a domain name), and a second setting that may require TLD permutation (e.g., replacing a TLD suffix of the domain name with another TLD). Domain permutations module 45 may receive (e.g., from domain extraction module 40) a first raw domain name D1 (e.g., my-company.com), and perform a plurality of permutations on the first raw domain name according to the received settings. In this example, the plurality of DNPs may include duplication of letters (e.g.: mmy-company.com, myy-company.com, etc.) and TLD permutations (e.g., my-company.co.br, my-company.org, etc.), and any combination thereof.

System 10 may include a validation module 35, configured to query, per at least one produced DNP, whether the domain name or DNP may be registered at a domain registrar 910, as elaborated herein. If the DNP may be registered at a domain registrar 910, domain permutations module 45 may forward the registered DNP as a raw domain name D1 to domain aggregation module 510.

In a similar manner to that discussed above, domain aggregation module 510 may include the raw domain name D1 in a list of domain names at a specific timing (e.g., a domain snapshot) D2. validation module 35 may repeat the query of domain registrar 910 at least at a first timing and at a second, later timing. Domain aggregation module 510 may subsequently produce a first list of domain names at a first timing (e.g., a domain snapshot) D2, associated with the first query at the first timing, and a second list of domain names at a second timing (e.g., a domain snapshot) D2 associated with the second query at the second timing.

In a similar manner to that discussed above, domain differentiator module 520 may analyze the domain snapshots D2, to identify or determine at least one newly registered DNP. For example, domain differentiator module 520 may compare the first domain snapshot D2 and the second domain snapshot D2, to identify at least one DNP that has been registered between the first timing and the second timing.

Domain differentiator module 520 may add the newly-registered DNP to the list of suspected domain names D3 and may attribute an RTS to the at least one suspected, newly-registered DNP according to at least one of the first and second timings. For example, domain differentiator module 520 may attribute the second timing as an RTS to the newly registered DNP, as the first occurrence in which the DNP has been registered by domain registrar 910.

System 10 may configure at least one perimeter module 70 to restrict at least one data transmission between secured computing device 80 and a computing device that may be associated with the suspected, newly-registered DNP, based on or according to the RTS, as elaborated herein.

Pertaining to the above example, system 10 may determine whether at least one DNP (e.g., my-company.org, with two 'y'3) has been registered recently, and may consequently restrict at least one data transmission between secured computing device 80 and a second computing device that may be associated with the recently registered domain. System 10 may thus secure computing device 80 by avoiding a condition in which a user of computing device 80 may be fooled to think that the recently registered DNP may actually be a trusted web domain (e.g., my-company.com, with one 'y').

According to some embodiments of the invention, crawler module 20 may include an Internet Protocol (IP) crawler module 220, that may be configured to proactively produce at least one IP address, and may query at least one network server 930 to determine whether the produced IP matches, or may be associated with a respective registered domain name.

IP crawler module 220 may produce at least one subset of all possible $2^{32}$ IP addresses. For example, IP crawler module 220 may receive (e.g., from a perimeter module 70 such as a VPN server) at least one IP address range that may be associated with at least one secured computing device 80 and produce a list of IP addresses spanning the subset range of addresses. In another example, IP crawler module 220 may produce the entire span of possible $2^{32}$ IP addresses.

IP crawler module 220 may address at least one IP address of the subset of IP addresses at a first timing. For example, IP crawler module 220 may browse the internet (e.g., by utilizing a web browser 20A) according to the produced subset of IP addresses, at least one IP address at a time (e.g., one IP address per second), at a first timing (e.g., on a first day).

If IP crawler module 220 is directed to an internet web page (e.g., if web browser 20A is directed to an internet web page), then IP crawler module 220 may extract at least one raw domain name D1 from the directed web page. For example, IP crawler module 220 may extract at least one raw domain name D1 included within a hyperlink in the web page, a URL line associated with the web page, and the like. IP crawler module 220 may store (e.g., on storage module 30) the raw domain name D1 in a first list of domain names, associated with a first timing. IP crawler module 220 may repeat the above steps (e.g., addressing at least one IP address of the subset of IP addresses and extracting at least one raw domain name D1 therefrom) at a second timing (e.g., on a second day).

In a similar manner to that discussed above, Domain aggregation module 510 may subsequently produce a first domain snapshot D2 associated with the first query at the first timing, and a second snapshot D2 associated with the second query at the second timing Domain differentiator module 520 may analyze the domain snapshots D2, to identify or determine at least one raw domain name that may have been recently introduced. For example, domain differentiator module 520 may compare the first domain snapshot D2, including a first list of raw domain names D1 and the second domain snapshot D2, including a second list of raw domain names D1, to identify at least one recently-introduced raw domain name D1 (e.g., a domain name that may have been entered in the second domain snapshot D2 but may not have been present in the first domain snapshot D2).

According to some embodiments of the invention, domain differentiator module 520 may add the recently-introduced raw domain name D1 to the list of suspected domain names D3 and may attribute an RTS to the at least one suspected, recently-introduced domain name according to at least one of the first and second timings. For example, domain differentiator module 520 may attribute the second timing as an RTS (e.g., a UTC timestamp) to the recently-introduced domain name, as the first occurrence in which the domain name has been encountered during the IP crawling (e.g., marking the first time that IP crawler module 220 has been directed to that domain).

In some embodiments of the invention, domain differentiator module 520 may be configured to add the recently-introduced raw domain name D1 to the list of suspected domain names D3 pending a process of registration validation. For example, validation module 35 may be configured to query a domain registrar 910, to ascertain whether the recently-introduced domain name has been registered, as explained herein. If validation module 35 asserts that the domain registrar 910 is indeed registered by the domain registrar 910, domain differentiator module 520 may add the recently-introduced raw domain name D1 to the list of suspected domain names D3.

System 10 may then configure at least one perimeter module 70 to restrict at least one data transmission between secured computing device 80 and a computing device that may be associated with the obtained, newly-certified domain name based on or according to the RTS, as elaborated herein.

According to some embodiments of the invention, crawler module 20 may include a domain crawler module 230, configured to proactively browse the internet (e.g., by utilizing web browser 20A), using one or more raw domain names D1.

For example, domain crawler module 230 may receive (e.g., from domain extraction module 40, from domain permutation module 45, from zone-file crawler 210, from IP crawler 220 or from certificate crawler 240) at least one first raw domain name D1. Domain crawler module 230 may use or utilize a web browser (e.g., 20A) to browse the internet at a first timing (e.g., on a first day), and access one or more sites that correspond with the at least one first raw domain name D1. Domain crawler module 230 may be configured to parse content of the accessed web site and extract at least one second raw domain name D1 from the accessed web sites. The at least one second raw domain name D1 may include, for example, a domain name that appears in a URL line, a domain name that appears in a link, and the like.

System 10 may handle the at least one second raw domain name D1 in a similar manner to that described above, in relation to IP crawler module 220, and will only be recapped here, for the purpose of brevity:
- domain aggregation module 510 may add at least one second raw domain name to a first domain snapshot D2 associated with the first timing;
- domain crawler module 230 may repeat the browsing process (e.g., utilize web browser 20A) at a second timing;
- domain aggregation module 510 may add at least one second raw domain name to a first domain snapshot D2 associated with the first timing;
- domain differentiation module 520 may identify at least one newly-encountered raw domain name, add the identified raw domain name D1 to a list of suspected domain names and attribute an RTS to the suspected domain name according to at least one of the first timing and second timing;
- optionally, domain differentiation module 520 may add the identified, newly-encountered raw domain name to the list of suspected domain names D3 pending a domain validation process by validation module 35; and system 10 may configure at least one perimeter module 70 to restrict data transfer of at least one secured computing device 80 to/from a second computing device (e.g., element 95) that may be associated with the suspected domain name (e.g., included within a domain associated with the suspected domain name).

As explained above, embodiments of the invention may receive or generate at least one raw domain name D1, and may include one or more methods for ascertaining whether the received or generated raw domain name D1 actually represents a registered internet domain. System 10 may then determine the time of registration of the received or generated domain name, attribute an RTS thereto, and restrict data transfer between a secured computing device 80 and the domain, based on or according to the RTS.

System 10 may include a domain validation module 35, configured to ascertain whether the received or generated domain name actually represents a registered internet domain, in any one of the ways elaborated in the following examples:

In a first example, domain validation module 35 may query a domain registrar server 910 to determine whether the received or generated domain name is, in fact, registered by the registrar. This method may be straightforward but may not be without disadvantages. For example:
- the registrar may or may not provide a suitable interface (e.g., a web interface) to facilitate such a query;
- the registrar response is non-hermetic or non-deterministic, meaning that the registrar may or may not reply to domain name queries by domain validation module 35;
- the registrar may be configured to block repetitive domain name queries;
- the registrar's answer will typically be slow, making a large number of queries may not be time-wise feasible.

In a second example, domain validation module 35 may produce a network query, such as a "WhoIs" query, to at least one network server 930, to ascertain whether the domain name may be registered. As known in the art, a WhoIs response may include information pertaining to the queried domain name, including for example the identity of a respective registrar who may have registered the domain name. As in the former example, the use of this system may not be deterministic (e.g., where a correct response may not be guaranteed) and slow.

In a third example, domain validation module 35 may produce a Domain Name Server (DNS) query, to at least one DNS network server 930, to ascertain whether the domain name may be listed by a DNS server. However, as known in the art, as domain names may be registered by a registrar but not listed by a DNS server, the DNS query response may only determine whether the domain name may be both registered and listed on a DNS server. The DNS query response may not be deterministic in a condition in which the domain name is, in fact registered, but does not include DNS records.

In a fourth example, domain validation module 35 may employ a method that may herein be referred to as Authoritative Resolving (AR) to determine whether a received or generated domain name may be registered by the registrar.

Unlike the examples provided in the preceding examples, which may be employed by commercially available systems, employing AR for ascertaining registration of a domain name may be both deterministic and quick, and may thus be preferred by embodiments of the invention.

Domain validation module 35 may extract a TLD suffix (e.g., ".com", ".org", ".net" and the like) of the received or generated domain name (e.g., generated-domain.com) and may query at least one global root Domain Name Server (DNSs) for an identification of a first Authoritative Name Server (ANS) associated with the extracted TLD.

Domain validation module 35 may then query the first ANS for an identification of a second ANS, that may be associated with the domain name (generated-domain.com).

It is to be noted that domain validation module 35 does not need to further query the second ANS for data pertaining to the registration of the domain name:
- if the first ANS responds with the identification of the second ANS then domain validation module 35 may determine that the domain name may be registered at a domain registrar; and
- if the first ANS does not respond with the identification of the second ANS, then domain validation module 35 may determine that the domain name may not be registered at a domain registrar.

According to some embodiments of the invention, validation module 35 may be configured to receive the list of suspected domain names D3 and produce a restriction list (e.g., element D4 in FIG. 3) therefrom.

In some embodiments of the invention, validation module 35 may be configured to produce the restriction list from the list of suspected domain names D3 based on or according to the RTS attributed to each domain name therein. For example, if a difference between an obtained RTS, pertaining or attributed to a registered domain name and the current time does not exceed a predefined threshold (i.e., a short period of time has elapsed since the domain has been established as registered), then validation module 35 may add an entry in the restriction list, associating the registered domain name with the respective RTS. In a complimentary manner, if a difference between an RTS in the restriction list and the current time exceeds the predefined threshold (i.e., a long period of time has elapsed since the domain has been established as registered), validation module 35 may omit the entry associating the registered domain name with the respective RTS from the restriction list.

In some embodiments of the invention, validation module 35 may add a raw domain name D1 that may be present in the list of suspected domain names D3 as an entry in the restriction list D4 only if a corresponding domain may be registered. For example, validation module 35 may receive at least one raw domain name D1 that originated from IP crawler module 220. Validation module 35 may determine (e.g., via the authoritative resolving method described above) whether a domain corresponding with the raw domain name D1 may be registered by domain registrar 910. If validation module 35 determines that such a domain may, in fact, be registered, validation module 35 may add the raw domain name D1 to restriction list D4.

System 10 may include an integrator module 60, adapted to configure at least one perimeter module 70 to restrict at least one data transmission between the secured computing device 80 and a second computing device that may be associated with a domain that may be included in the restriction list.

For example, integrator module 60 may be adapted to configure at least one perimeter module 70 such as a firewall, an email gateway, a web proxy server, and the like to perform at least one restricting action, including for example:
- blocking at least one message from the second computing device;
- applying a quarantine on at least one message from the second computing device;
- blocking at least one message from the secured computing device;
- applying a quarantine on at least one message from the secured computing device; and
- blocking browsing of the secured computing device in the registered domain.

Reference is now made back to FIG. 2, which is a block diagram depicting a system 10 for mitigating phishing attacks against a secured computing device according to some embodiments of the invention.

As shown in FIG. 2, the organizational perimeter modules 70 may include an email gateway 730. According to some embodiments of the invention, integrator module 60 may be adapted to configure email gateway 730 to block inbound and/or outbound email transactions between at least one first secured computing device 80 and at least one second computing device associated with a domain that may be listed on the restriction list. Integrator module 60 may further configure email gateway 730 to block emails messages that may contain a reference (e.g., a hyperlink) to the restricted domain. In some embodiments of the invention, integrator module 60 may be configured to log (e.g., on storage module 30) data pertaining to at least one occurrence of a blocked email transaction, including for example: a source of the email message, a target of the email message, content of the email message, metadata (e.g., timing) associated with the email message, and the like.

As shown in FIG. 2, the perimeter modules block 70 may include a web proxy server 720. Integrator module 60 may be adapted to configure web proxy server 720 to enable or disable browsing of computing device 80 on web pages according to the restriction list. For example, integrator module 60 may be configured to add a URL filtering rule to web proxy 720, so as to block and monitor any attempt to surf to the phishing domain.

Perimeter modules block 70 may include a firewall server 710. Integrator module 60 may be adapted to configure firewall server 710 to block DNS resolving (e.g., querying a DNS server for the respective IP) of a domain that may be included in the restriction list. Integrator module 60 may also add at least one URL filtering rule, to prevent reception and/or transmission of the secured computing device from and/or to a second computing device associated with the restricted domain.

Perimeter modules block 70 may include a Domain Name Server (DNS) 740. Integrator module 60 may be adapted to configure DNS 740 to prevent resolution of a phishing domain. For example, DNS server 740 may receive a domain that may be included in the restriction list and may refrain from producing a respective IP address associated with the domain name (or a subdomain thereof), a process that may commonly be referred to in the art as 'resolving' of the domain, to prevent a secured user 80 from accessing the restricted domain.

Perimeter modules block 70 may include a Virtual Private Network (VPN) server 760. Integrator module 60 may be adapted to configure VPN server 760 to block at least one data transaction between secured computing device 80 and at least one second computing device associated with a domain that may be listed on the restriction list.

Perimeter modules block 70 may include at least one Endpoint Protection Solution (EPS) 770, that may be an application or computing process tailored for protection of a specific computing device or platform, as known in the art. Integrator module 60 may be adapted to provide at least one Indicator of Compromise (IOC), such as a restricted domain name, a corresponding IP address and the like to EPS 770. EPS 770 may, in turn be configured to restrict data transfer to and/or from a domain associated with the IOC, as known in the art.

Perimeter modules block 70 may include at least one Security Information and Event Management (SIEM) module 750, as known in the art. Integrator module 60 may be adapted to provide at least one IOC such as a restricted domain name, a corresponding IP address and the like to SIEM module 750, which may monitor data transfer to and/or from a domain associated with the IOC, as known in the art.

Figure 5:
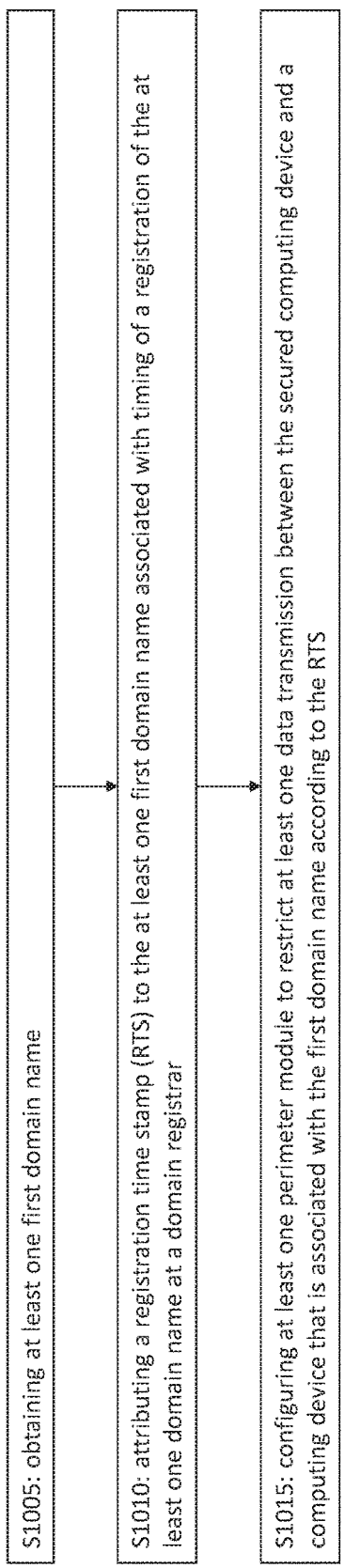
FIG. 5 is a flow diagram, depicting a method for mitigating phishing attacks against a secured computing device according to some embodiments of the invention.

Reference is now made to FIG. 5, which is a is a flow diagram, depicting a method for mitigating phishing attacks against a secured computing device according to some embodiments of the invention.

As shown in step S1005, one or more processors (e.g., element 2 of FIG. 1) may be configured to obtain at least one domain name (e.g., a raw domain name D1 of FIG. 3).

As shown in step S1010, the one or more processors may be configured to attribute a registration time stamp (RTS) to the at least one first domain name associated with timing of a registration of the at least one domain name at a domain registrar.

As shown in step S1015, the one or more processors may configure at least one perimeter module (e.g., perimeter modules 70 of FIG. 2) to restrict at least one data transmission between the secured computing device 80 and a computing device 95 that may be associated with the first domain name, based on the RTS. For example, if the difference between the current time and the RTS is below a predefined threshold (e.g., the domain name has been recently registered), them embodiments of the method may restrict transfer of data (e.g., block upload and/or download of data) between computing device 80 and computing device 95.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for mitigating, by one or more processors, phishing attacks against a secured computing device, the method comprising:
   receiving from one or more domain registrars, at least one first DNS zone file at a first timing and at least one second DNS zone file at a second timing;
   parsing the first DNS zone file, to produce a first list comprising one or more domain names;
   parsing the second DNS zone file, to produce a second list comprising one or more domain names;
   comparing the first list and second list to detect at least one newly registered domain name that is present only in one of the first DNS zone file and second DNS zone file;
   attributing a registration time stamp (RTS), associated with timing of a registration of the at least one newly registered domain name at a domain registrar to the at least one newly registered domain name, according to at least one of the first timing and the second timing; and
   configuring at least one perimeter module to restrict at least one data transmission between the secured computing device and a computing device that is associated with the newly registered domain name, based on the RTS.

2. The method of claim 1, further comprising:
   obtaining at least one first domain name;
   receiving, by the one or more processors, a list comprising at least one permutation setting;
   producing, by the one or more processors, a plurality of domain name permutations (DNPs), based on the list of permutation settings, on the at least one first domain name; and
   querying, by the one or more processors, at least one external online resource, per at least one produced DNP, whether the DNP is registered at a domain registrar.

3. The method of claim 2, wherein the at least one online external data resource is selected from a list comprising: a domain registrar server, and a certification authority (CA) server.

4. The method of claim 2, wherein domain name permutations are produced from at least one of: the first obtained domain name and a domain name that is associated with the secured computing device.

5. The method of claim 4, wherein the at least one permutation setting is selected from a list comprising at least one of: duplicating at least one letter of a domain name; and replacing a Top-Level Domain (TLD) suffix of the domain name with another TLD.

6. The method of claim 4, wherein querying is performed at least at a first timing and at a second, later timing, to determine at least one newly registered DNP, and wherein the method further comprises attributing an RTS to the at least one newly registered DNP according to at least one of the first and second timings.

7. The method of claim 2, wherein querying whether the domain name is registered at a domain registrar comprises:
   extracting a TLD suffix of the domain name;
   querying at least one global root Domain Name Server (DNS) for an identification of a first Authoritative Name Server (ANS) associated with the extracted TLD;
   querying the first ANS for an identification of a second ANS associated with the domain name;
   if the first ANS responds with the identification of the second ANS then determining that the domain name is registered at a domain registrar; and
   if the first ANS does not respond with the identification of the second ANS then determining that the domain name is not registered at a domain registrar.

8. The method of claim 1, further comprising:
   querying, by the at least one processor, at least one CA to obtain at least one first certificate transparency log at a first timing and at least one second certificate transparency log at a second timing;
   analyzing the at least one first certificate transparency log and at least one second certificate transparency log to detect at least one newly signed certificate;
   parsing, by the at least one processor, the newly signed certificate to obtain at least one domain name associated with the newly signed certificate; and
   attributing an RTS to the at least one obtained domain name according to at least one of the first and second timings.

9. The method of claim 1, further comprising:
   a. producing at least one subset of all possible 2^32 Internet Protocol (IP) addresses;

b. utilizing a web browser to browse the internet using the at least one produced subset of IP addresses at a first timing;
c. if the web browser is directed to an internet web page, then extracting at least one domain name from the directed web page, and storing the extracted domain name in a first list of domain names;
d. repeating steps b and c at a second timing, to produce a second list of domain names; and
e. analyzing the lists of domain names to obtain at least one newly registered domain name.

10. The method of claim 1, further comprising:
a. utilizing, by the at least one processor a web browser to browse the internet using the at least one first domain name;
b. if the web browser is directed to an internet web page, then extracting, by the at least one processor, at least one second domain name from the directed web page, and storing the extracted domain name in a first list of domain names;
c. repeating steps b and c at a second timing, to produce a second list of domain names; and
d. analyzing, by the at least one processor, the lists of domain names to obtain at least one newly registered domain name.

11. The method of claim 1 wherein restriction of data transmission comprises at least one of:
blocking at least one message from the second computing device;
applying a quarantine on at least one message from the second computing device;
blocking at least one message from the secured computing device;
applying a quarantine on at least one message from the secured computing device; and
blocking browsing of the secured computing device in the registered domain.

12. The method of claim 1, wherein the at least one perimeter module is selected from a list comprising at least one of:
a mail gateway;
a web proxy server;
a firewall server;
a Domain Name Server (DNS);
a Virtual Private Network (VPN) server;
a Security Information and Event Management (SIEM) software; and
an Endpoint Protection Solution (EPS).

13. The method of claim 1, wherein:
if a difference between an obtained RTS pertaining to a registered domain name and the current time does not exceed a predefined threshold, then adding an entry in a restriction list, associating the registered domain name with the respective RTS; and
if a difference between an RTS in the restriction list and the current time exceeds the predefined threshold, then omitting the entry associating the registered domain name with the respective RTS from the restriction list.

14. The method of claim 13 comprising configuring the at least one perimeter module to restrict at least one data transmission between the secured computing device and a second computing device according to the restriction list.

15. A system for mitigating phishing attacks against a secured computing device, the system comprising: a non-transitory memory device, wherein modules of instruction code are stored, and at least one processor associated with the memory device, and configured to execute the modules of instruction code, whereupon execution of said modules of instruction code, the at least one processor is further configured to perform at least one of:
receive from one or more domain registrars, at least one first DNS zone file at a first timing and at least one second DNS zone file at a second timing;
parse the first DNS zone file, to produce a first list comprising one or more domain names;
parse the second DNS zone file, to produce a second list comprising one or more domain names;
compare the first list and second list to detect at least one newly registered domain name that is present only in one of the first DNS zone file and second DNS zone file;
attribute a registration time stamp (RTS) associated with timing of a registration of the at least one newly registered domain name at a domain registrar to the at least one newly registered domain name, according to at least one of the first timing and the second timing; and
configure at least one perimeter module to restrict at least one data transmission between the secured computing device and a computing device that is associated with the newly registered domain name, based on the RTS.

16. A method for restricting transfer of data between a first computing device and a second computing device, the method comprising:
querying at least one online external resource at a first timing and at a second timing, to obtain at least one DNS zone file comprising at least one domain name;
parsing the DNS zone file of the first timing to produce a first list comprising one or more domain names;
parsing the DNS zone file of the second timing, to produce a second list comprising one or more domain names;
differentiating the first list and second list to detect at least one newly registered domain name that is present only in one of the DNS zone file of the first timing and the DNS zone file of the second timing;
producing a list of suspected domain names according to the differentiation; and
configuring at least one perimeter module to restrict at least one data transmission between the first computing device and a second computing device, based on the current time and at least one of the first timing and second timing.

* * * * *